(12) United States Patent
Estevam De Britto et al.

(10) Patent No.: US 12,470,772 B2
(45) Date of Patent: Nov. 11, 2025

(54) SYSTEM FOR INGESTING ALTERNATIVE VIDEO AND/OR AUDIO MEDIA SYNCHRONIZED WITH THE DISPLAY OF VIDEO AND AUDIO CONTENT OF LINEAR ORIGIN, AND RELATED IMPLEMENTATION METHOD

(71) Applicant: MIRAKULO SOFTWARE LTDA, Rio de Janeiro (BR)

(72) Inventors: David Estevam De Britto, Niteroi (BR); David Estevam De Britto, Jr., Rio de Janeiro (BR)

(73) Assignee: MIRAKULO SOFTWARE LTDA, Rio de Janeiro (BR)

( * ) Notice: Subject to any disclaimer, the term of this patent is extended or adjusted under 35 U.S.C. 154(b) by 0 days.

(21) Appl. No.: 17/795,722

(22) PCT Filed: Jan. 22, 2021

(86) PCT No.: PCT/BR2021/050033
§ 371 (c)(1),
(2) Date: Jul. 27, 2022

(87) PCT Pub. No.: WO2021/151182
PCT Pub. Date: Aug. 5, 2021

(65) Prior Publication Data
US 2023/0096987 A1    Mar. 30, 2023

(30) Foreign Application Priority Data
Jan. 29, 2020    (BR) .................. 10 2020 001967 8

(51) Int. Cl.
*H04N 21/462*    (2011.01)
*H04N 21/435*    (2011.01)
(Continued)

(52) U.S. Cl.
CPC ....... *H04N 21/4622* (2013.01); *H04N 21/435* (2013.01); *H04N 21/44016* (2013.01); *H04N 21/64322* (2013.01)

(58) Field of Classification Search
CPC ......... H04N 21/23424; H04N 21/4622; H04N 21/435; H04N 21/44016; H04N 21/64322
See application file for complete search history.

(56) References Cited

U.S. PATENT DOCUMENTS

| | | |
|---|---|---|
| 8,667,525 B2 | 3/2014 | Candelore |
| 8,671,426 B2 | 3/2014 | Flickinger |

(Continued)

*Primary Examiner* — Nicholas T Corbo
(74) *Attorney, Agent, or Firm* — RAPHAEL BELLUM PLLC (57) ABSTRACT

The present disclosure relates to a system implemented in a digital TV receiver that provides a broadcaster with a reliable method of ingesting alternative video and/or audio content received through a broadband connection, replacing parts of the main video and/or audio content, received from the broadcast transmission signal, aiming to customize the consumer's experience during digital video and/or audio consumption. The system regularly evaluates the digital TV receiver's environment parameters that may vary at any time, as well as its connection to the Internet. Sufficient requirements for the replacement process are met, namely the quality and completeness required for reproducing the alternative video and/or audio content, so as to provide success and quality of such reproduction, improving consumer experience without experiencing failures, interruptions, lack of fluidity or lack of consistency, effectively equating the consumption experience of the alternative content to the same level of quality standard as the main content.

17 Claims, 7 Drawing Sheets

(51) Int. Cl.
*H04N 21/44* (2011.01)
*H04N 21/643* (2011.01)

(56) References Cited

U.S. PATENT DOCUMENTS

| | | |
|---|---|---|
| 9,479,801 B2 | 10/2016 | Higgs |
| 2004/0244035 A1 | 12/2004 | Wright |
| 2007/0188656 A1 | 8/2007 | Chisaka |
| 2008/0010584 A1 | 1/2008 | Corsetti |
| 2013/0144725 A1* | 6/2013 | Li .................... H04N 21/25891 |
| | | 705/14.66 |
| 2016/0182923 A1* | 6/2016 | Higgs .................. H04H 20/106 |
| | | 725/34 |
| 2019/0268392 A1 | 8/2019 | Santangelo |
| 2020/0059692 A1* | 2/2020 | Seo .................. H04N 21/44016 |

\* cited by examiner

MVA content descriptor:

```
{
    startId: event ID X,
    duration: 70,
    content: [
        {
            startId: 0,
            duration: 30,
            transition: 2
        },
        {
            startId: 32,
            duration: 20,
            transition: 0
        },
        {
            startId: 52,
            duration: 16,
            transition: 2
        }
    ]
}
```

SYSTEM FOR INGESTING ALTERNATIVE VIDEO AND/OR AUDIO MEDIA SYNCHRONIZED WITH THE DISPLAY OF VIDEO AND AUDIO CONTENT OF LINEAR ORIGIN, AND RELATED IMPLEMENTATION METHOD

FIELD OF THE INVENTION

The present invention relates to a system for ingesting Alternative Video and/or Audio content, hereinafter called AVA, obtained from sources such as the Internet, local storage or private local network, in a synchronized digital TV receiver displaying Main Video and/or Audio content, hereinafter called MVA, which is characterized as a content of linear origin and characteristic obtained from the transmission of digital TV signal, such as on terrestrial, satellite or cable TV channels.

The present invention also refers to a method for the implementation of said system in said TV receiver, which comprises the synchronized, dynamic and segmented replacement of sections of the MVA, called programming blocks, with equivalent sections of AVA, allowing the broadcaster to personalize the content at any level of desired segment granularity, following its criteria and up to the level of the single consumer or viewer.

It is important to note that according to the system, object of the present invention, the broadcasting stations responsible for transmitting MVA must notify the linear signal receiver (terrestrial, satellite or cable), so that it is prepared to display AVA, indicating wherefrom the AVA will be obtained, at what moment during the display time flow such content should be obtained and from what moment it should be displayed instead of the MVA, and the content display is conditioned upon the evaluation of the receiver operation at that moment. Such an evaluation of the receiver operation occurs at different times, and several conditions and parameters are considered, including the CPU (Central Processing Unit) usage status, the amount of RAM resources, the amount of local storage memory resources, the available internet bandwidth, and the resolution of the candidate AVA to be reproduced.

It should be noted, however, that the broadcaster is also responsible for transmitting on its digital signal an interactive application to be run on the receiver when the channel of the broadcaster is tuned by the viewer. During its execution, this application will perform the interpretation of the programming blocks and the synchronization control.

The system according to the present invention has, as a principle, a display transition control, which ensures a synchronism between the display of the MVA and the AVA, lessening the users' perception of alternation between sources and ensuring continuity and fluidity in the audio and video content display as far as possible.

Additionally, the present invention relates to displaying contents on a device comprising a "smart receiver", broadly conceived as any digital TV receiver with capabilities for Internet connectivity, and loading and running software applications.

BACKGROUND OF THE INVENTION

As well known, a digital TV receiver is a device capable of receiving and decoding digital signals sent by various broadcasting stations, using terrestrial, cable or satellite signals, for displaying on a monitor screen. Such a device can be fixed (integrated or not into the TV set), portable or mobile.

Smart receivers are currently widely available worldwide in many formats, types and models, for instance, "Set-Top Boxes" decoders—STB, smart TVs, mobile receivers such as cell phones capable of capturing digital TV signal, and so on. Smart receivers not only provide conventional television broadcasting functionality, in the form of linear programming channels, but also have integrated Internet and Web access resources. Thus, smart receivers are examples of technological convergence between computers and television sets, and therefore also include Internet connection devices that use the TV screen as a display device. Software components or applications running on a smart receiver can be preloaded on the device or installed and updated online on-demand through an app store, similar to what is done on modern handheld devices, such as cell phone devices.

Traditionally, the display of linear origin MVA content, for example, from a digital TV broadcaster, does not provide for that there is an alternation of content between the MVA and the AVA coming from another source other than the broadcast TV signal, due to the criticality of this operation that is dynamically, internally carried out in the digital receiver, unlike the traditional process described above. This transition would present a high risk of causing loss or failures of synchronism between the sources and thus resulting in an unpleasant and incomprehensible experience for the consumer/viewer. It should be noted that the fluid experience for the consumer of broadcasting services is generally considered by all broadcasters to be a historical, fundamental and differentiated feature of reliability, mainly in contrast to the expected experience of the consumer of online streaming services, who already lives with, and even waits for, several moments of interruptions.

Additionally, it should be noted that now, in several regions and countries that have digitized their terrestrial TV broadcast receiver base, there is a need to maintain the compatibility of all installed digital receivers with the requirements included in the respective digital broadcast standards and, from the moment the first receivers reached the market, updates, changes and new implementations in the characteristics of the data broadcasted by the broadcasters should respect and guarantee compatibility with the legacy base of installed equipment.

Document U.S. Pat. No. 9,479,801B2 refers to a method for inserting end-user-based customized commercial advertisements in hybrid or integrated terminals, supporting broadband and broadcasting, based on the presence of SCTE-35 markers (ANSI/SCTE 35 2013 "Digital Program Insertion Cueing Message for Cable") in the original content stream. It describes the display of advertisements on a hybrid terminal with connection to both the Internet and a broadcast network, such as a smart television (TV). Notably, the teachings described are directed to a system and method for cueing the time and content of the break schedule, such as, for example, customized advertisements to a viewer, within the setting of a hybrid terminal that receives such schedule via a TV broadcast network, by replacing the markers traditionally used by broadcasters to cue commercial breaks with one or more tables incorporated in the television content transport stream.

In the technique described by this document, the ad insertion markers present in the broadcast content transport stream are replaced by one or more Service Information (SI) tables, which contain information corresponding to the replaced markers. The transport stream containing the table is then delivered to the hybrid terminal. The SI table can include a file (manifest) to flag upcoming ad schedules. The manifest can provide information regarding the sources from which the hybrid terminal can search for customized ads and can identify the time break available in the transport stream to insert the searched ads. To enable the hybrid terminal to display customized ads to its viewer, the SI table can identify an Ad Decision Server (ADS), from which the hybrid terminal can request customized ads to be displayed to the viewer watching a TV program. Such advertisements are searched for and inserted into the break schedule based on the original break schedule and for replacing them.

There is a marked disadvantage of this technique when it describes the need for inserting extraordinary tables in addition to the tables already expected by the digital TV receiver within the structure of the signal generated by the broadcaster. Such technique assumes that the step of inserting these extraordinary tables is done by the broadcaster and depends on the correct implementation of extraordinary controls in order not to cause any possibility of compatibility problems when decoding the digital signal data in the digital TV receiver's native system. Unlike cable and satellite TV systems, whose receiver terminals can be customized according to any proprietary techniques or methods, digital terrestrial TV receivers (free/broadcast TV) present in the market, regardless of their manufacturers or models, have a legacy that demands backward compatibility. Such receivers must strictly follow a standard wherein the native operating system included in such a receiver may have problems when trying to decode information (such as a table) that is extraordinary, added outside the requirements recommended by such a standard for receiving and decoding the digital terrestrial TV signal (free TV).

The technique described in the aforementioned document has another significant deficiency when it describes that these tables are mandatorily built based on the presence of markers that must necessarily follow the technique prescribed in the SCTE-35 standard (ANSI/SCTE 35 2013 "Digital Program Insertion Cueing Message for Cable"), originally used by American cable TV. If broadcasters in a particular region or country do not use such a standard, the dependence on the existence of these markers, which must necessarily be inserted by the broadcaster since the creation of the original stream with digital TV content, may represent an insurmountable or difficult-to-solve particularization for the implementation of the technique described in the settings of such broadcasters.

Another restrictive issue evidenced by the technique presented lies in the fact that it is intended to replace only a specific type of content generated by the broadcaster, called interstitial breaks scheduled within the original content of the TV broadcaster for a certain broadcast channel, such as, commercial insertion. The entire context of the system presented refers to the issues of the ads generated in the broadcaster's programming, their generation, their replacement and the control of this replacement process.

The technique presented is notably completely silent on the issue of consumer experience, which is considered imperative for all broadcasters. For those skilled in the art, the document cited reveals that their teachings are based on the existence of time-controlled mechanisms. No framework, method or foundation is described in the presentation of said technique which could solve the issues of delays, display failures, timeless changes (as commonly observed during the display of live content—notably sports programming whose duration cannot be specified in advance) and several other similar issues known within the broadcast content display settings.

Therefore, the system for ingesting alternative video and/or audio content (AVA), according to the present invention, surprisingly observes all these important characteristics and peculiarities discussed above, solving the problems of the systems proposed by the state of the art in an advantageous and widely achievable manner.

BRIEF DESCRIPTION OF THE INVENTION

As will be noted herein, the terms such as "smart receiver", "digital TV receiver", "integrated receiver" and "IBB receiver" (Integrated Broadcast-Broadband) can be used interchangeably in the following description to refer to a device, regardless of any format or model, that integrates the support for connections to either a digital TV signal broadcast network, or a broadband network with Internet access.

The system described herein is based on the time synchronization method described in document BRPI0806069A2 (Karaoke) held by the same author, the same being complementary thereto in order to expand its scope and provide a dynamic operation, according to the conditions of use of the receiver.

More specifically, and not by way of limitation, particular embodiments of the present invention are based on a system and method for synchronizing and alternating the timing and display of the programming blocks content, e.g., customized advertisements, programs segmented for a specific region, audience, etc., on such a smart receiver.

The most current video and audio streaming applications, for example, providing content on-demand (VOD), assume that the consumer/viewer is identified only by the application, usually using parameters such as user/password and or authentication tokens. These applications are compatible with the smart digital TV receivers described above and, therefore, it is also expected that they can be installed on said digital TV receiver.

Additionally, it is assumed that the consumer/viewer who is identified only through an application, is linked to the linear video/audio source—MVA that is being displayed at that moment, in such a way that the replacement of MVA with AVA and the subsequent reverse operation of replacing the AVA with the MVA are performed in the correct manner, and that said application is properly authorized to perform the replacement of the MVA with the AVA and vice versa.

The system according to the present invention provides for that the digital TV set has a broadband Internet connection and that it also has internal and temporary media storage capacity.

As an end result, the system according to the present invention allows to merge the content broadcasted in an unrestricted and simultaneous way for several consumers/viewers with a content segmented or customized in a secure manner and as transparent as possible to the audience.

DETAILED DESCRIPTION OF THE INVENTION

The following description reveals the specific details and particularities of the present invention in order to provide a complete understanding thereof. However, those skilled in the art will understand that the teachings of the present invention can be embodied in different scenarios where these specific details are not used. In addition, certain methods, components and procedures better known in the context of the illustrated settings have not been described in detail so as not to depart from the scope of the present invention. As noted above, it should be understood that although the present invention is described primarily in the context of television programming delivered over a terrestrial broadcast network, that is, free/broadcast TV, the teachings contained herein can be used in any other broadcast setting, such as cable TV, satellite or digital radio, and for several different types of audiovisual content.

For the purposes of the present invention, in the description that will be given below, it should be considered that:
the term "digital TV receiver" shall be understood as any device supporting running digital files and capable of receiving and decoding digital TV signals sent by terrestrial, satellite or cable TV broadcasters, for displaying on a monitor or a speaker system. Such a device may be fixed, integrated or not into the TV set, portable or mobile;
the term "MVA—Main Audio and Video content" should be understood as comprising the main content that progresses without any intervention or control by the user. Examples of linear multimedia contents include, but are not limited to, the TV signal when reproduced in an uninterrupted manner;
the term "AVA—Alternative Video and Audio content" should be understood as comprising a content that, in order to progress, requires intervention or control by the system described herein, i.e., that requires interpreting the request coming from the broadcaster for its operation.

Therefore, the present invention relates to a system for ingesting alternative video and/or audio content synchronized with the display stream of video and audio content of origin and linear characteristic, in a digital TV receiver, controlled by an agent providing such content, for example, a broadcaster.

Additionally, the system according to the present invention implements a method that interprets the requests/signals from the broadcaster through a technique, such as, but not limited to, the known "System Events" technique. This signaling is interpreted by the system as a request to replace the content of linear (MVA) with alternative (AVA) characteristic.

Additionally, the system according to the present invention comprises a mechanism for identifying a programming block and data synchronization. This mechanism uses concepts described in the aforementioned patent BRPI0806069A2 (Karaoke), held by the same author, to synchronize data with broadcasting multimedia content with a new technique of describing a future programming block.

The purpose of this system mechanism of the present invention is to provide the digital TV receiver with knowledge of the structure of a programming block that will be displayed at any time in the future, and that can be prepared to perform operations at the moment this block is being displayed.

The most emblematic use of this technique, as proposed herein, is the replacement of linear content, originating from a broadcast signal (MVA), with a non-linear content (Alternative Video and Audio, or AVA). For this, the receiver must know in advance the programming block that will be replaced, to correctly list the AVA content and make necessary preparations to reproduce such AVA content without loss of experience for the viewer, e.g., the viewer does not observe interruption in the reproduction of AVA content, or drop/shift in the quality of AVA content. In addition, it is important that the AVA content is compatible with the replaced MVA content, especially in terms of time, that is, the time size of the blocks must be the same and belonging to the same advisory (or content) rating, that is, the two contents must have the same advisory rating.

The interpretation of the programming block and the data synchronization is carried out by an interactive application, broadcasted via Digital Storage Media Command and Control (DSMCC). This application aims to: (i) interpret the DSMCC stream sent with the synchronization events; and (ii) interpret the programming block descriptor, broadcasted, for example, similarly to the "Synchronization Events". The programming block can be sent at an update rate similar to or lower than that of the "Synchronization Events".

The interactive application sends the synchronization events and the programming block descriptor to a decision-making system that, in conjunction with the data from the interactive application, is fed by a data collection mechanism of the digital TV receiver to decide: (i) whether any content described in the MVA content descriptor should be replaced; and (ii) whether the replacement of the content can be done smoothly, without impairing the viewer's experience of watching TV.

Once the decision-making device identifies that the MVA content must be replaced by AVA content, the system according to the present invention drives a video selector and decoder to perform content switching.

The broadcast transport stream of programming blocks can be broadcasted to the digital TV terminal according to the teachings discussed in the present invention. It should be noted that the teachings of the present invention can be applied, although not limited to, to a setting wherein the transport stream is delivered over a television broadcast network that follows digital terrestrial TV standards, which require the hierarchical structure of the transport stream, which is standardized, not be altered in any way, as this ensures that this broadcasted signal remains fully operational on all equipment available on the market, since no structural modifications to this broadcasted signal are required, which would lead to a deviation from the requirements of the specific digital terrestrial TV standard.

However, those skilled in the art will readily observe that the teachings of the present invention can be embodied without restricting its application to terrestrial digital TV broadcast settings and, in fact, can be equally applied to a transport stream provided by a television broadcast network by other means of transmission, for example, satellite, cable, IPTV, etc.

Similarly, although the teachings of the present invention describe a Digital TV transmission and reception setting, those skilled in the art will note that the scenarios can easily be extended to any digital broadcast transmission and reception setting, including digital TV and/or radio.

BRIEF DESCRIPTION OF THE FIGURES

The following figures illustrate.

Figure 1:
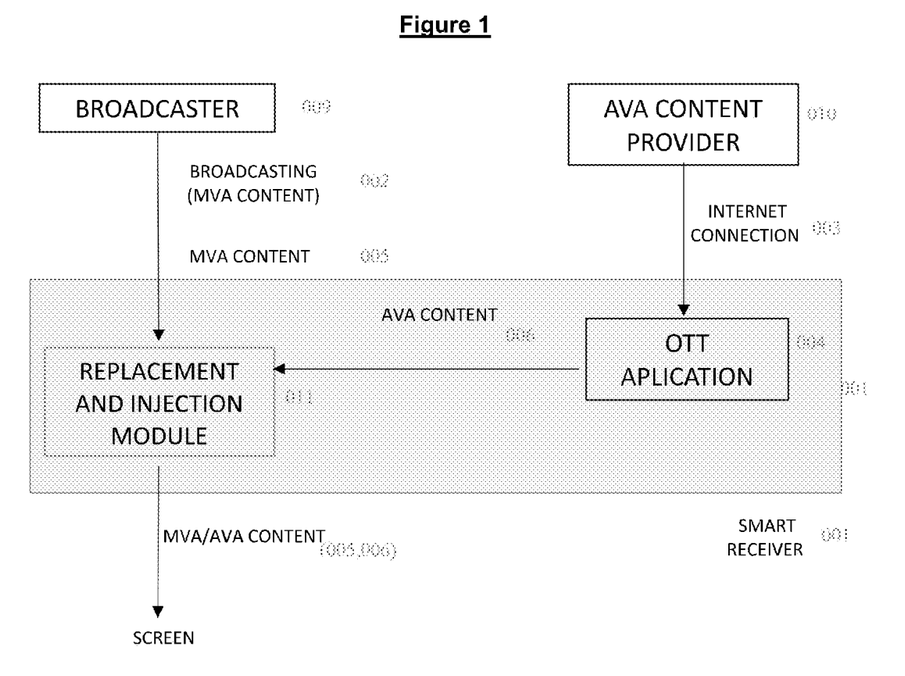
FIG. 1—representation of a system according to the present invention.

FIG. 1 illustrates an embodiment of the system according to the present invention showing a smart receiver (001) connected to a conventional television broadcast network (002) and to a broadband network (003) enabling access to the Internet. For the purposes of the present invention, each of the networks (002-003) is considered a fully digital network. The smart receiver (001) can support the reproduction of conventional broadcast television content through its connection to the television broadcast network (002), such as a digital terrestrial TV broadcast network, a digital cable TV network, or a digital satellite TV network. In addition to traditional television set functions, the smart receiver (001), and, through its connection to the broadband network (003), can also support the delivery of on-demand online content such as streaming services, Over-The-Top (OTT) content or video on-demand (VOD) through an Over-The-Top Application (OTT Application) (004).

The broadband network (003) is a standard Internet protocol (IP)-based network, such as a private IP network owned by a telecommunications operator, or a cable operator or a publicly available broadband provider.

Thus, the smart receiver (001) supports a model in which the linearly (or live) broadcasted TV content, hereinafter called MVA content (005), is consumed over a digital broadcasting connection (002) supplemented with a digital broadband internet connection (003). The digital broadcasting connection can be, for example, a transmission in the Integrated Services Digital Broadcasting-Terrestrial (ISDB-T)-based transmission standard used in the Brazilian Digital TV System, or a transmission based on another type of digital TV standard, for example, Digital Video Broadcasting-Terrestrial (DVB-T), Advanced Television Systems Committee (ATSC), etc., provided by the broadcast network based on terrestrial, cable or satellite access.

The digital broadband connection (003) allows the smart receiver (001) to access alternative audiovisual content (AVA) (006) that can be downloaded or broadcasted to the smart receiver (001).

The smart receiver (001) can be an IBB digital TV receiver that supports the integration of broadcast transmission (002) and broadband distribution (003) to the end consumer. The IBB smart receiver can operate with different digital transmission technologies, such as terrestrial, cable or satellite transmissions.

Figure 2:
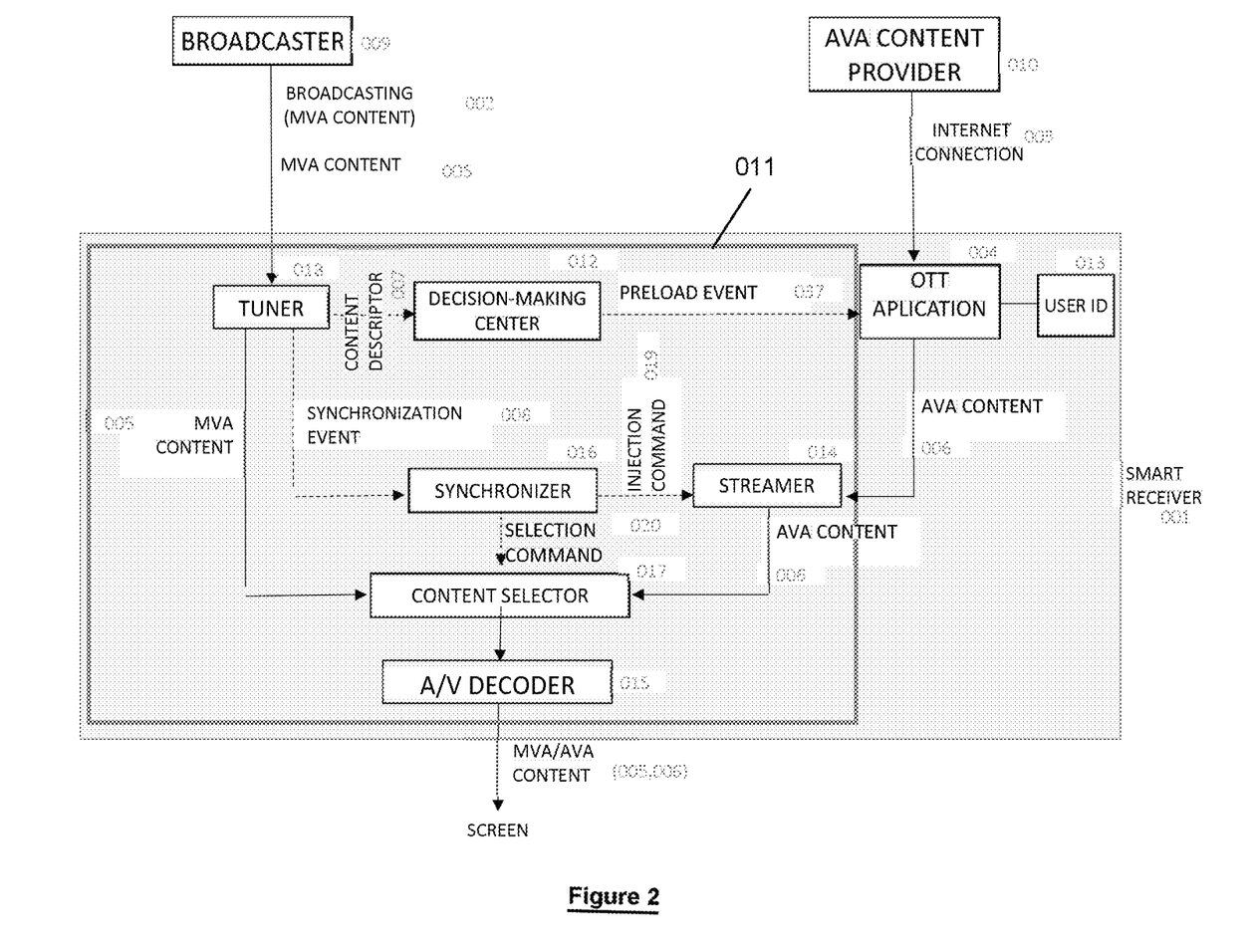
FIG. 2—representation of a module of injection and replacement of linear content with non-linear content.

FIG. 2 illustrates a content replacement and injection module (011) of the smart receiver (001), responsible for consuming the MVA content (005), broadcasted by the broadcast transmission (002), and the AVA content (006), broadcasted over the broadband network (003). This module performs the switching of MVA content (005) to AVA content (006) through data analysis—content descriptors (007) and synchronization events (008)—sent by the broadcaster (009).

Figure 3A:
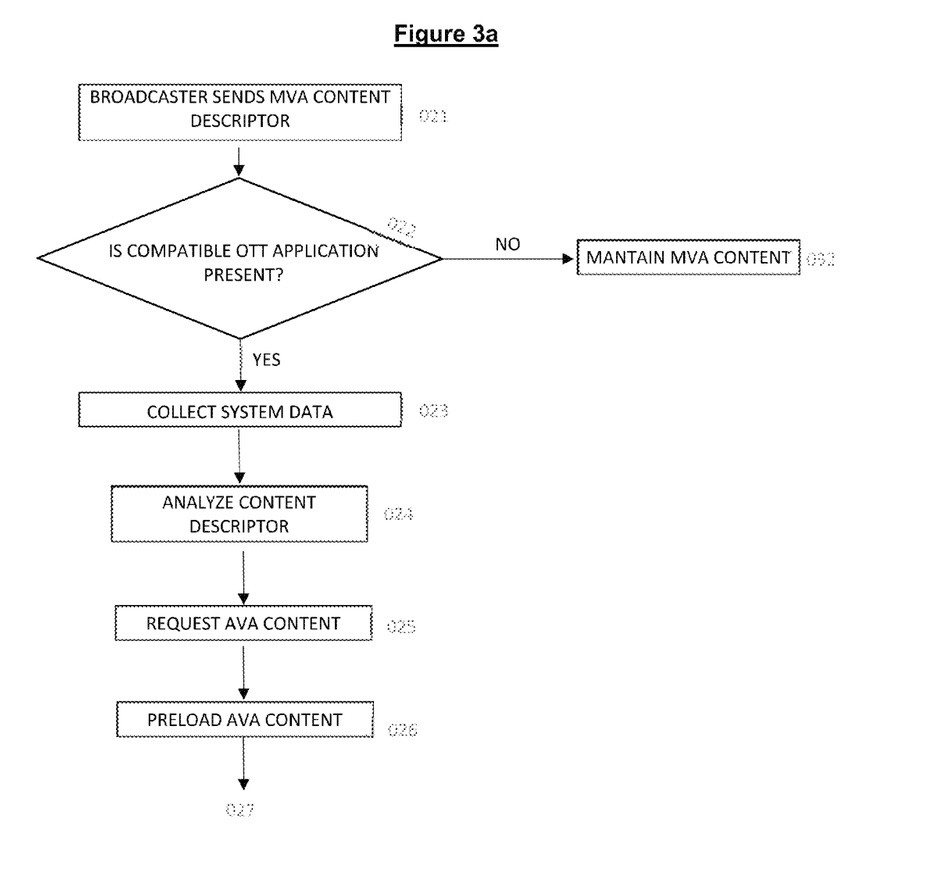
FIGS. 3a and 3b—flow chart of a method of replacing MVA content with AVA content.
Figure 3B:
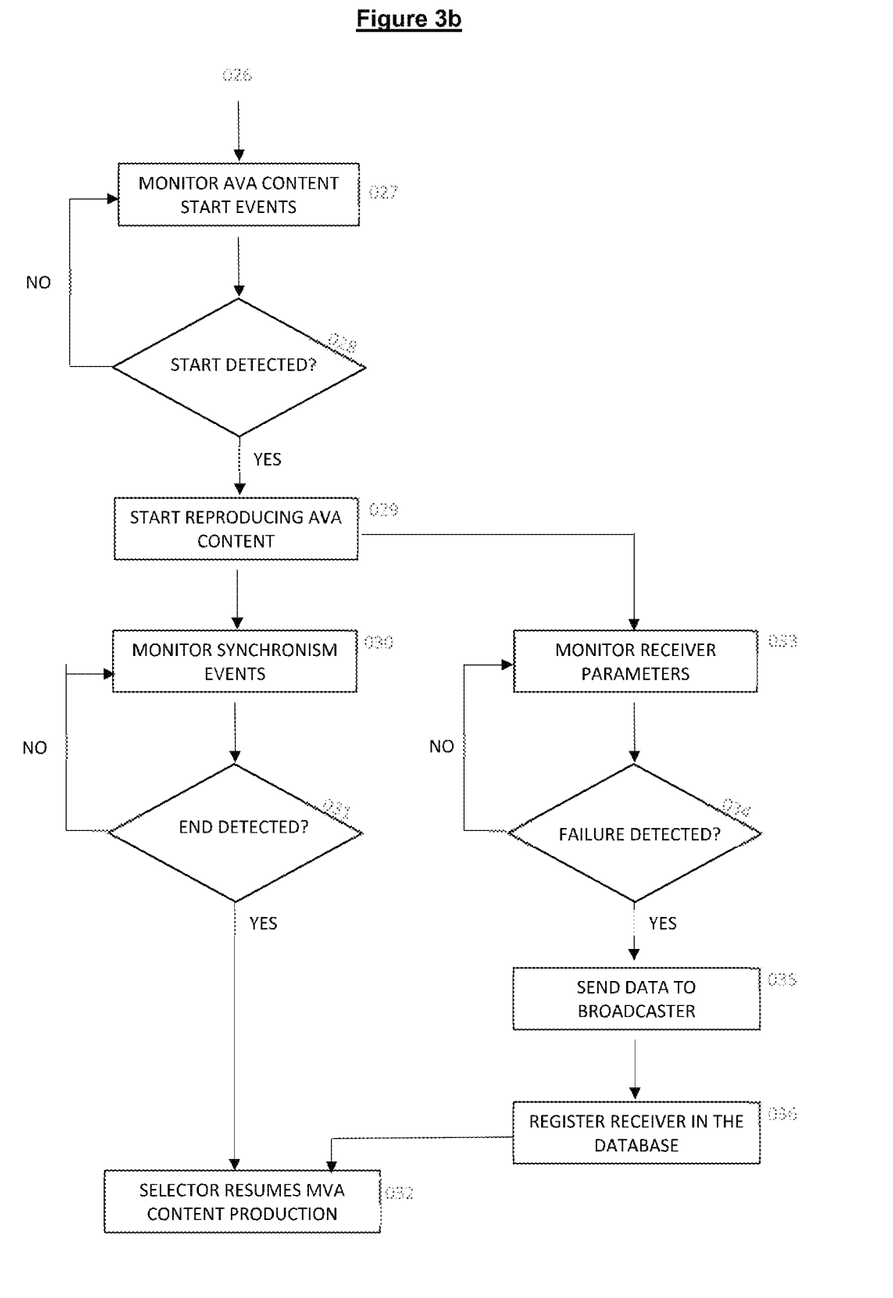

FIGS. 3a and 3b illustrate the method used by the content replacement and injection module (011) to perform the replacement of the MVA content (005) with the AVA content (006), ensuring the best possible experience for the viewer.

As observed, the system according to the present invention interprets the requests/signals from the broadcaster (009) using a technique such as, but not limited to, the so-called "System Events". This signaling is interpreted by the system as a request to replace the MVA content (005) with the AVA content (006), informing the digital TV receiver of the structure and nature of the MVA content (005).

Figure 5A:
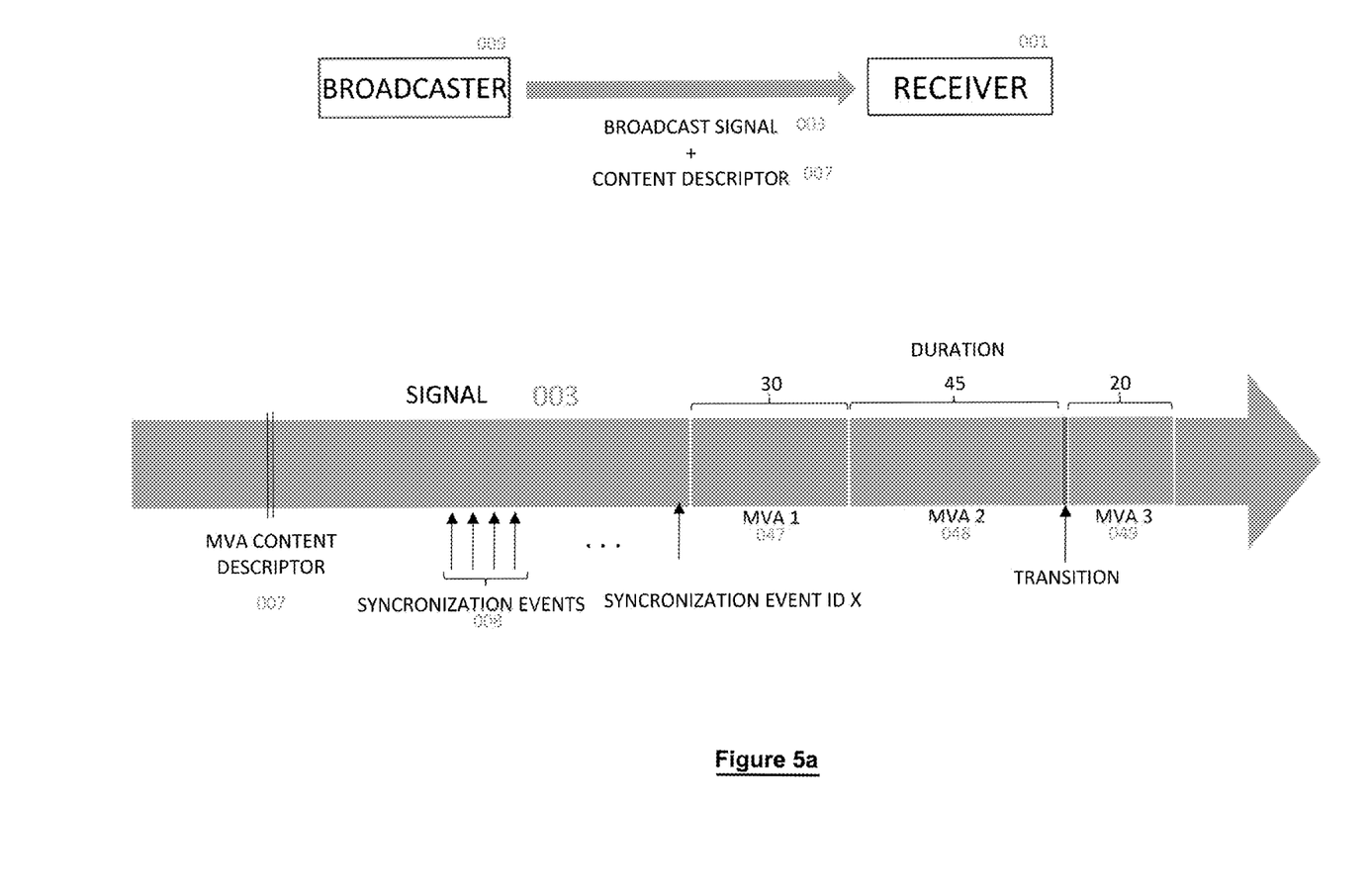
FIGS. 5a and 5b—representation of a MVA content block descriptor and example of choosing a MVA content to be replaced.
Figure 5B:
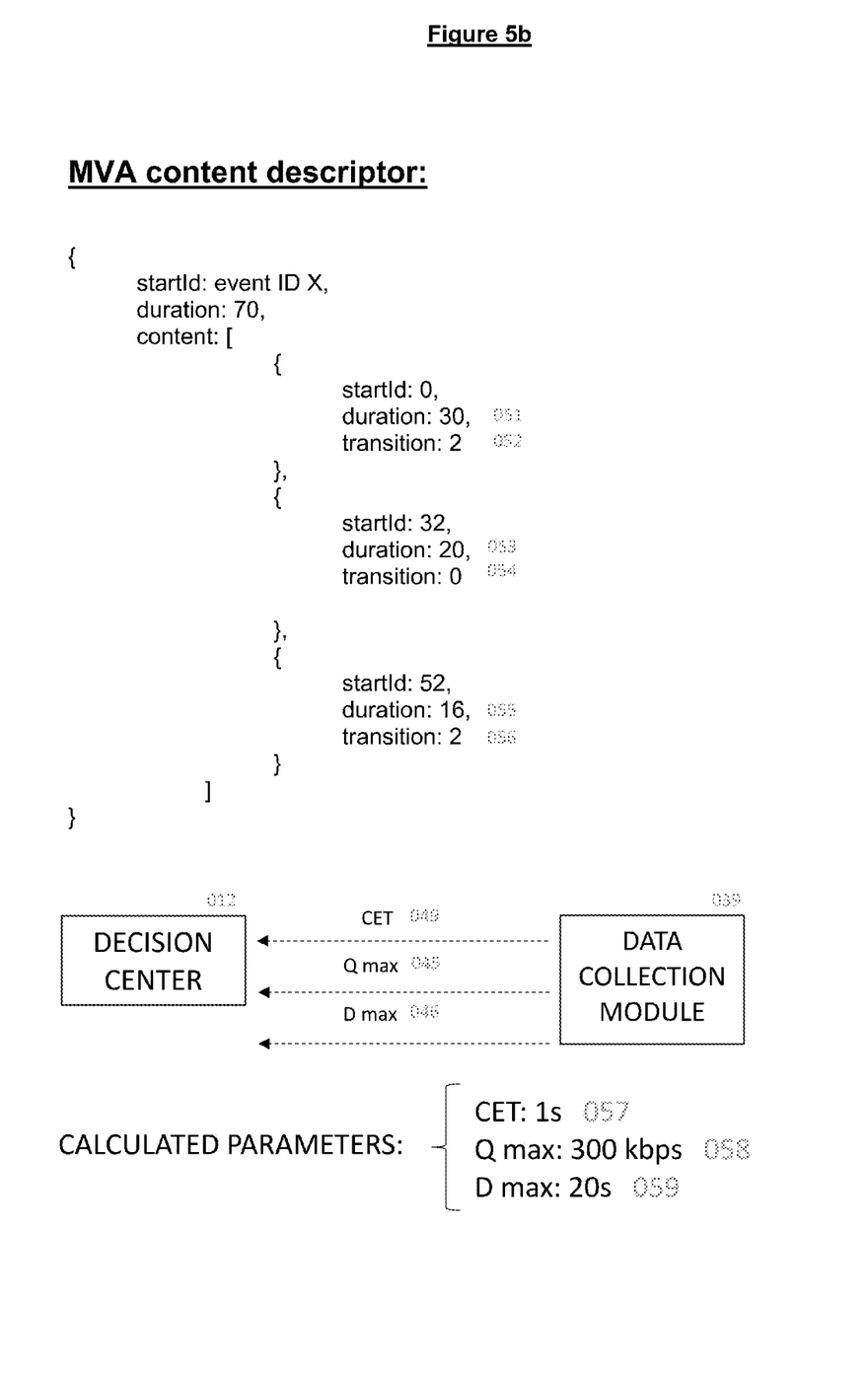

According to the method for implementation of said system according to the present invention in said TV receiver, in the initial step (021), the digital TV receiver receives from the broadcaster (009) a MVA content descriptor (007), as illustrated by FIGS. 5a and 5b, which will be shown at any time in the future. A decision-making center (012) then analyzes the MVA content descriptor (007) to detect if any specific content is liable to be replaced by AVA content (006), by means of a specific marking/tag in the descriptor of that content. The decision-making center (012) is responsible for assessing whether the digital TV receiver has sufficient conditions to perform the replacement of the MVA content (005) with the AVA content (006) without impairing the viewer's experience.

In the next step (022), the decision-making center (012) then evaluates whether an OTT-type application ("Over-The-Top") (004) associated with the tuned channel is installed on the digital TV receiver and if the consumer/viewer is exclusively identified (013). In this way, the digital TV receiver will be able to select and request to display an AVA (006) at the correct time and in accordance with the broadcaster's criteria (009) for that viewer/consumer. The OTT application (004) is also responsible for interacting with an AVA content provider (010) and obtaining from this source the AVA content (005) that will be reproduced by the system. Access to the AVA content provider (010) can be done, for example, through an HTTP connection via the Internet, accessed over a broadband network (003).

In the next step (023), the decision-making center (012) seeks to determine whether the replacement of the MVA content (005) with the AVA content (006) can be performed without impairing the viewer's experience. For this purpose, the decision-making center (012) collects relevant parameters from the digital TV receiver through a data collection module (039), in order to determine: (a) whether the AVA content (006) can be reproduced in its entirety without interruptions; (b) whether the replacement of the MVA content (005) with the AVA content (006) can be performed within an acceptable time, without impairing the viewer's experience.

Examples of relevant parameters include, but are not limited to, those below:

Internet connection speed (003);
Internet connection latency (003);
Internet connection packet loss rate (003);
Percentage of CPU usage (040);
Percentage of system memory usage (041);
Percentage of video memory usage (042);
Average time to replace a MVA content (005) with an AVA content (006) in this receiver;
Accumulated number of failures when replacing a MVA content (005) with an AVA content (006) in this receiver;
Restriction to reproduce the AVA content (005).

Provided with all relevant receiver parameters, according to the present invention, the data collection module (039), seeks to estimate the time required to exchange the MVA content (005) for the AVA content (006), which is called content exchanging time (CET) (044), the maximum quality (Qmax) (045), and the maximum duration (Dmax) (046), of an AVA content (006) that can be reproduced without interruption.

The data collection module (039) then checks whether the device is registered in an exclusively identified receiver database (043). If the device is registered, it will be prevented from replacing MVA content (005) with AVA content (006), and, therefore, the replacement process is concluded. The purpose of this database (043) is to register all devices that have failed in replacing MVA content (005) with AVA content (006). This database (043) can be implemented locally in the receiver (001), or remotely in a broadcaster (009) center. The broadcaster (009) can freely decide when a device is registered or removed from this database (043).

Once performed, in step (024), the decision-making center (012) analyzes the MVA content descriptor (007) to search for a MVA content (005) compatible with the CET, Qmax and Dmax estimated by the data collection module (039).

FIGS. 5a and 5b illustrate a possible MVA content descriptor (007) and compatibility with the CET (057), Qmax (058) and Dmax (059) parameters. It is observed that among the present descriptors, the MVA content (047) is not able to be replaced as its duration (051) is greater than Dmax (059), and the content (048) is not compatible, since the start time (054) is lower than the estimated CET (057). The only content eligible for replacement is content (049), which has a duration (055) of less than Dmax (059) and a sufficient transition time (056) that is greater than CET (057), so that the transition can be carried out without loss of content.

Then, in step (025), the decision-making center (012) informs the OTT application (004) about the nature of the MVA content (005) that will be replaced, as well as the estimated maximum quality Qmax (058) for AVA content (006). The OTT application (004) sends this information, together with the viewer's identification to an AVA content provider (010). It is expected that the provider will choose the AVA content (006) compatible with the MVA content (005) selected for replacement, according to techniques and products commonly used in the market for segmenting VoD (video-on-demand) content. It is important that the content meets the requirements defined by the system for maximum quality and maximum duration, in order to provide the best possible experience for the viewer.

In the next step (026), the decision-making center (012) provides resources for the reproduction of the AVA (006), by checking if the conditions for its reproduction are met. Typical conditions, for example, can be, among others, the percentage of CPU usage (040), amount of system memory (041) available, amount of storage (050) available, bandwidth speed and latency (003). The decision-making center (012) requests (037) to the OTT application (004) that the AVA content (006) be loaded into a streaming module (014), using commonly known techniques for reproducing a remote content.

A fundamental difference, however, is that the streaming module (014) must perform all the required steps to reproduce AVA content (006), with the exception of the last step, which is to inject the content into the decoder (015). We call this process of preloading the AVA content (006).

In the next step (027), if all the conditions for reproduction are met, and the AVA content (006) is properly preloaded, the decision-making center sends a start command (038) to the synchronizer (016), which monitors the synchronization events (008) to ensure the perfect synchronization in the transition between the reproduction of the MVA (005)→AVA (006)→MVA (005).

Through the synchronization events (008), the broadcaster (009) can control the exact time when the AVA content (006) should start, the exact time when the AVA content (006) should end and whether the content AVA (006) should end early.

The final condition is to ensure the return to MVA (005) reproduction status without unwanted failures, and maintaining the correct timing for resuming its display, with no loss of MVA (005) or AVA (006) content to the viewer.

In some cases, the broadcaster (009) may decide to end the reproduction of AVA content (006) early, for example, in the case of an urgent live event that must be shown to the viewer immediately.

In the next step (028), the synchronizer (016) detects the exact moment when AVA content (006) starts by monitoring the synchronization events (008). It is important that this control is performed by the broadcaster (009). Those skilled in the art will know that a broadcast transmission (002) can hardly be planned far in advance, due to the occurrence, for example, of extraordinary programs, such as live sporting events, in which it is not previously and precisely known when a MVA content (005) will start or end. Thus, unlike the MVA content descriptor (007), which must be sent as early as possible to allow preloading, the AVA content (006) start time must be notified to the digital TV receiver as close as possible to the instant that the AVA content (006) is to start. The difference in temporal requirement of these two signals shows that the synchronization event (008) is fundamental to guarantee, with maximum accuracy, the start time of reproduction of the AVA content (006). The synchronization events (008) are therefore important for the system of the present invention (011) to be able to balance these different requirements, by performing all the validation and preloading processes of an AVA content (006) as early as possible, while starting the reproduction of this AVA content (006) as accurately as possible.

Thus, once the AVA content (006) start time is detected, in step (029), the synchronizer sends an injection command (019) of AVA content (006) to the streaming module (014), and a content switching command (020) to the content selector (017). The content selector (017) switches the source of audio and video content that will be injected into the decoder (015), which previously received this content directly from the tuner (018), and now starts to receive this content from an AVA content server (010), generally through, for example, an HTTP connection via the Internet (003), using a broadband network.

In the next step (030), while the AVA content (006) is being reproduced, the synchronizer (016) monitors the synchronization events (008) sent by the broadcaster in order to determine the end time of the AVA content. This time may represent the natural end of the AVA content (006), or a voluntary and abrupt end of the AVA content (006) by the broadcaster (009).

In step (031) the system naturally detects the end of the AVA content (006) by the end of the AVA content (006) or by an end signal in this step (031). The content selector (017) promptly replaces the AVA content (006) with the MVA content (005) from the digital TV signal broadcast network (002), in step (032).

Finally, after the display of the AVA (006), the OTT application (004) can collect information relevant to the TV broadcaster (009), such as, but not necessarily restricted to, user identification, date, time, IP address, bandwidth, latency time, TV receiver manufacturer/model, AVA display status, etc., for statistical purposes.

Figure 4:
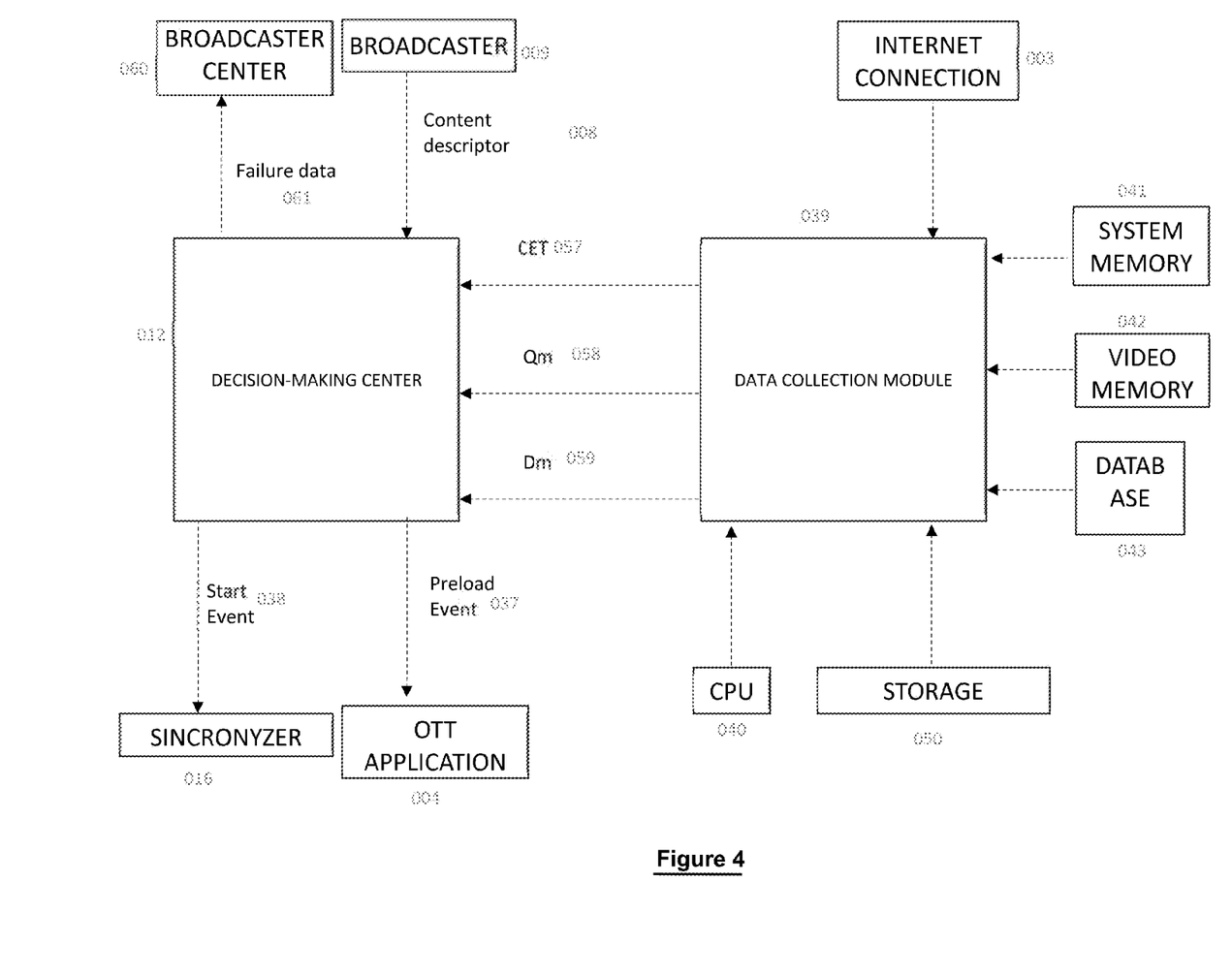
FIG. 4—representation of a decision-making center.

In any situation (033), the decision-making center (012) checks, at different times, the conditions of the digital TV receiver by regularly evaluating various parameters, such as the CPU usage, amount of general-purpose memory (RAM) available, amount of storage memory for temporary use, speed and latency of the Internet connection, the characteristics of the AVA content (006) to be reproduced and the user's identification status (identified/unidentified), in such a way that the factors critical for the synchronization are mitigated. In case of failure (034), in step (035), the decision-making center (012) notifies a broadcaster center (060), by sending failure data (061), the parameters collected from the digital TV receiver at the time of the failure, the characteristics of the AVA content (006) and the identification (013) of the viewer. The broadcaster center (060) decides whether this receiver should be characterized from this moment on as having an active restriction on the reproduction of the AVA (006), registering it in the receiver database (043) as being restricted to the MVA content (005) replacement, in step (036).

Failures in the reproduction of the AVA content (006) can be characterized by, but not limited to, the following: interruptions of the reproduction of the AVA content (006), failure to synchronize the audio and the video of the AVA content (006), spontaneous abortion of the reproduction of AVA content (006), and inability to access the AVA content provider (010).

Failures in the replacement of MVA content (005) with AVA content (006) can be characterized, for example, as delays in the switching of the MVA content (005) with the AVA content (006) and vice versa, and incompatibility of the duration of the MVA content (005) and the AVA content (006).

EMBODIMENT EXAMPLE

FIGS. 1, 2 and 3 described above represent a non-limiting schematic example of the scope of the invention. Such examples represent some of the possible ways of operating the system according to the present invention, in a digital TV receiver, where the broadcaster wishes to create a customized Video/Audio reproduction experience for a given group of consumers or for a single consumer.

The invention claimed is:

1. A system for ingesting alternative video and audio media content, synchronized with a display of video and audio content of linear origin, and replacing parts of the video and audio content of linear origin with the alternative video and audio media content, the system comprising:
a smart digital TV receiver connected to a conventional television broadcast network and a broadband network enabling access to the Internet, said smart digital TV receiver supporting reproduction of conventional broadcast television content through connection of the smart digital TV receiver to the television broadcast network and, through connection of the smart digital TV receiver to the broadband network, also supporting delivery of on-demand online content such as streaming services, over-the-top (OTT) content or video on-demand (VOD);
an over-the-top (OTT) application, configured to receive the alternative video and audio (AVA) content, through the connection to the broadband network; and
a content replacement and injection module configured to receive the original main video and audio (MVA) content through the connection to the television broadcast network, wherein all the MVA content broadcasts linearly (or live), said content replacement and injection module comprising:
 a digital TV receiver tuner configured to receive the MVA content coming from the connection to the television broadcast network;
 a decision-making center configured to decide and perform replacement of said MVA content with the AVA content based on a regular evaluation of environmental parameters of the smart digital TV receiver, the environmental parameters reflecting capacity and performance conditions of the smart digital TV receiver, as well as connection of the smart digital TV receiver to the Internet, which vary in time, the environmental parameters being relevant for reproduction of an entirety of the AVA content, without interruptions, drops, or shifts in quality;
 a synchronizer configured to send an alternative content injection command, and to command selection of the AVA content;
 a streaming module, configured to receive the AVA content from the OTT application and to inject said AVA content into a content selector;
 the content selector configured to receive a selection command from the synchronizer and perform replacement of the MVA content with the AVA content; and
 a decoder configured to allow the smart digital TV receiver to access the MVA content or the AVA content downloaded or broadcasted to said smart digital TV receiver and, after its decoding, to display the AVA content on a screen of the smart digital TV receiver,
wherein the content replacement and injection module is configured to:
 interpret requests/signals from a broadcaster,
 inform the smart digital TV receiver about a structure and nature of the MVA content,
 receive, by the digital TV receiver tuner, a MVA content descriptor sent by the broadcaster for MVA content that will be displayed at any time in the future,
 analyze the MVA content descriptor by the decision-making center to detect if any specific part of the MVA content can be replaced by the AVA content, through a specific marking in the MVA content descriptor,
 assess, by the decision-making center, whether the OTT application associated with a tuned channel is installed on the smart digital TV receiver and whether a consumer/viewer is exclusively identified,
 select by the digital TV receiver tuner, and request the display of the AVA content, at a correct time and in accordance with criteria of the broadcaster, for the consumer/viewer,
 estimate, through a data collection module, a content exchange time (CET) required to perform the replacement of the MVA content with the AVA content, a maximum quality (Qmax), and a maximum duration (Dmax) of the AVA content that can be reproduced in its entirety without interruptions, drops, or shifts in quality,
 verify, by the data collection module, whether the smart digital TV receiver is registered in an exclusively identified receiver database, wherein the registered receiver is characterized as having an active restriction on the reproduction of the AVA content based on previous failure data, and is actively restricted from performing the replacement of the MVA content,
 analyze, by the decision-making center, the MVA content descriptor searching for a specific part of the MVA content compatible with the CET, Qmax and Dmax estimated by the data collection module,
 provide information, by the decision-making center, to the OTT application about the nature of the MVA content that will be replaced, and about the estimated maximum quality for the AVA content, ensuring the AVA content meets the requirements for Qmax and Dmax, provide, by the decision-making center, the necessary resources for the reproduction of the AVA content, checking that the conditions for its reproduction of the AVA content are met, assess, by the decision-making center, whether the smart digital TV receiver has sufficient conditions to perform a replacement of the MVA content with the AVA content without impairing consumer/viewer experience, by performing an evaluation of the relevant parameters of the environment and the broadband connection of the smart digital TV receiver, request, by the decision-making center, to the OTT application that the AVA content be preloaded into a streaming module, send a start command from the decision-making center to the synchronizer, detect, by the synchronizer, an exact moment for the reproduction of the AVA content to start by monitoring synchronization events sent by the broadcaster, send, by the synchronizer, the alternative content injection command to ingest the AVA content to the streaming module, and a content switching command to the content selector, switch, by the content selector, the source of the AVA content that will be injected into the decoder, effectively transitioning from the MVA content to the AVA content, monitor, by the synchronizer, the synchronization events sent by the broadcaster, ensuring synchronism in the transition from the MVA content to the AVA content and synchronism in the transition from the AVA content back to the MVA content, determine, by the synchronizer, an end time of the AVA content by reaching the scheduled end of the reproduction of the AVA content or by receiving an early end signal in the monitored synchronization events, promptly switch, by the content selector, the source of the AVA content back to the digital TV signal broadcast network, effectively transitioning from the AVA content back to the MVA content, wherein if the decision-making center reaches a decision that sufficient conditions for the reproduction of the AVA content are not met, then the decision-making center notifies the broadcaster by sending information such as failure data, the parameters collected from the smart digital TV receiver's environment at the time of failure, the characteristic of the AVA content, and the identification of the consumer/viewer, and collect, by the OTT application, information relevant to the broadcaster.

2. The system according to claim 1, wherein the the smart digital TV receiver is configured as an IBB digital TV receiver supporting the integration of broadcast transmission and broadband distribution to an end consumer.

3. The system according to claim 2, wherein the the IBB digital TV receiver is configured to operate with different digital terrestrial, cable or satellite broadcasting technologies.

4. The system according to claim 1, wherein the broadband network is a network based on a private Internet Protocol (IP) owned by a telecommunication operator or a cable operator or a publicly available broadband provider.

5. The system according to claim 1, wherein the smart digital TV receiver uses said digital broadband connection to access the alternative AVA content that can be downloaded or broadcasted to the smart digital TV receiver.

6. The system according to claim 1, wherein the digital broadcasting connection is an Integrated Services Digital Broadcasting-Terrestrial (ISDB-T)-based transmission standard used in the Brazilian Digital TV System provided by the broadcast network based on terrestrial, cable or satellite access.

7. The system according to claim 1, wherein the digital broadcasting connection is a transmission based on digital TV standard Digital Video Broadcasting-Terrestrial (DVB-T), or Advanced Television Systems Committee (ATSC), provided by the broadcast network based on terrestrial, cable or satellite access.

8. The system according to claim 1, wherein the content replacement and injection module is further configured to provide interaction of the OTT application with an AVA content provider, in order to obtain from the AVA content provider the AVA content that will be reproduced by the system.

9. The system according to claim 1, wherein the data collection module performs the steps of:
verifying if the smart digital TV receiver is registered in the exclusively identified receiver database, characterized as having an active restriction for the reproduction of the AVA content based on previous failure data, and, therefore, being actively restricted from performing the replacement of the MVA content,
collecting relevant parameters from the smart digital TV receiver and its broadband connection, including:
Internet connection speed;
Internet connection latency;
Internet connection packet loss rate;
Percentage of CPU usage;
Percentage of system memory usage;
Percentage of video memory usage;
Average time to replace the MVA content with the AVA content in the smart digital TV receiver;
Accumulated number of failures when replacing the MVA content with the AVA content in the smart digital TV receiver; and
Restriction to reproduce the AVA content;
estimating the time required to perform the exchange of the MVA content with the AVA content, wherein the time is called content exchange time (CET), the maximum quality (Qmax), and the maximum duration (Dmax) of an AVA content, so that the AVA content can be reproduced without interruption and drops in quality; and
collecting the relevant parameters and data estimated in the previous steps for the decision-making center.

10. The system according to claim 9, wherein the decision-making center is further configured to:
determine whether the AVA content can be reproduced in its entirety without interruption or drops in quality; and
determine whether the replacement of the MVA content with the AVA content can be carried out within an acceptable time, without impairing the experience of the consumer/viewer, by performing a regular evaluation of parameters in the smart digital TV receiver's environment that reflect the capacity and performance conditions of the smart digital TV receiver, as well as its connection to the Internet, which vary at any time, wherein the parameters are relevant for the reproduction of the AVA content in its entirety without interruption or drops in quality.

11. The system according to claim 10, wherein if the decision-making center reaches a decision that sufficient conditions for the reproduction of the AVA content are not met, then the decision-making center is further configured to:
notify the broadcaster by sending information such as failure data, the environmental parameters collected from the smart digital TV receiver at the time of failure, the characteristics of the AVA content, and the identification of the consumer/viewer, wherein the broadcaster decides whether the smart digital TV receiver should be characterized from this moment as having an active restriction on the reproduction of the AVA content and registers the smart digital TV receiver in the smart digital TV receiver database as being restricted from performing the MVA content replacement.

12. The system of claim 1, wherein the information relevant to the broadcaster collected by the OTT application includes user identification, date, time, Internet Protocol (IP) address, bandwidth, latency time, TV receiver manufacturer/model, AVA content display status, or a combination thereof.

13. A method for implementing a system capable of ingesting alternative video and audio (AVA) media, synchronized with a display of linear video and audio content from a broadcaster and replacing parts of the original main video and audio (MVA) content, wherein the method is based on regular evaluation of parameters in an environment of a digital TV receiver that reflect a capacity and performance conditions of the digital TV receiver, as well as connection of the digital TV receiver to the Internet, which vary in time, wherein the parameters are relevant for reproduction of an entirety of the AVA content without interruptions or drops in quality, wherein the method comprises:
interpreting requests/signals from the broadcaster,
informing the digital TV receiver about a structure and nature of the MVA content,
receiving, by the digital TV receiver, a MVA content descriptor sent by the broadcaster for content that will be displayed at any time in the future,
analyzing the MVA content descriptor by a decision-making center to detect if any specific content can be replaced with the AVA content, through a specific marking in the MVA content descriptor,
assessing, by the decision-making center, whether an over-the-top (OTT) application associated with a tuned channel is installed on the digital TV receiver and whether a consumer/viewer is exclusively identified,
selecting by the digital TV receiver, and requesting the display of the AVA content, at a correct time and in accordance with criteria of the broadcaster, the consumer/viewer,
estimating, through a data collection module, a content of exchange time (CET) required to perform the replacement of the MVA content with the AVA content, a maximum quality (Qmax), and a maximum duration (Dmax), of the AVA content that can be reproduced in its entirety without interruptions or drops in quality,
verifying, by the data collection module, whether the digital TV receiver is registered in an exclusively identified receiver database, wherein the registered receiver is characterized as having an active restriction on the reproduction of the AVA content based on previous failure data and is actively restricted from performing the replacement of the MVA content as a result,
analyzing, by the decision-making center, the MVA content descriptor searching for a MVA content compatible with the CET, Qmax, and Dmax estimated by the data collection module,
providing information, by the decision-making center, to the OTT application about the nature of the MVA content that will be replaced, and about the estimated maximum quality for the AVA content, ensuring the AVA content matches the requirements for Qmax and Dmax without drops in the quality,
providing, by the decision-making center, necessary resources for the reproduction of the AVA content,
assessing, by the decision-making center, whether the digital TV receiver has sufficient conditions to perform a replacement of the MVA content with the AVA content without impairing an experience of the consumer/viewer, by performing an evaluation of the relevant parameters of the environment and broadband connection of the digital TV receiver,
requesting, by the decision-making center, to the OTT application that the AVA content be preloaded into a streaming module,
sending a start command from the decision-making center to the synchronizer,
detecting, by the synchronizer, an exact moment for reproduction of the AVA content to start by monitoring the synchronization events sent by the broadcaster,
sending, by the synchronizer, an injection command to ingest the AVA content to the streaming module, and a content switching command to the content selector,
switching, by the content selector, the source of audio and video content that will be injected into a decoder of the digital TV receiver, effectively transitioning from the MVA content to the AVA content,
monitoring, by the synchronizer, the synchronization events sent by the broadcaster, ensuring synchronism in a transition between MVA content to AVA content to MVA content reproduction,
determining, by the synchronizer, an end time of the AVA content by reaching the natural end of the AVA content reproduction or by receiving an early end signal in the monitored synchronization events,
promptly switching, by the content selector, the source of audio and video content, back to the digital TV signal broadcast network, effectively transitioning from the AVA content back to the MVA content,
wherein if the decision-making center reaches a decision that sufficient conditions for the reproduction of the AVA content are not met, then the decision-making center notifies the broadcaster by sending information such as failure data, the parameters collected from the environment of the digital TV receiver at the time of the failure, the characteristics of the AVA content, and the identification of the consumer/viewer, and
collecting, by the OTT application, information relevant to the broadcaster.

14. The method according to claim 13, wherein the method further comprises the interaction of the OTT application with an AVA content provider, in order to obtain from the AVA content provider the AVA content that will be reproduced by the system.

15. The method according to claim 14, wherein the data collection module performs the steps of:
verifying if the digital TV receiver is registered in the exclusively identified receiver database, characterized as having an active restriction for the reproduction of the AVA content based on the information of previous failure data and, therefore, being actively restricted from performing the replacement of the MVA content, collecting relevant parameters from the digital TV receiver and its environment and the broadband connection, as well as from the exclusively identified receiver database, including:
Internet connection speed;
Internet connection latency;
Internet connection packet loss rate;
Percentage of CPU usage;
Percentage of system memory usage;
Percentage of video memory usage;
Average time to replace a MVA content with an AVA content in this the digital TV receiver;
Accumulated number of failures when replacing a MVA content with an AVA content in the digital TV receiver; and
Restriction to reproduce the AVA content;

estimating the CET, Qmax, and Dmax of the AVA content so that the AVA content can be reproduced without interruption or drops in quality; and collecting the relevant parameters and data estimated in the previous steps for the decision-making center.

16. The method according to claim 15, wherein the decision-making center further performs the steps of:
determining whether the AVA content can be reproduced in its entirety without interruption or drops in quality; and
determining whether the replacement of the MVA content with the AVA content can be carried out within an acceptable time, without impairing the experience of the consumer/viewer, by performing a regular evaluation of the parameters in the digital TV receiver's environment that reflect the capacity and performance conditions of the digital TV receiver, as well as its connection to the Internet, which vary at any time, wherein the parameters are relevant for the reproduction of the AVA content in its entirety without interruption or drops in its quality.

17. The method of claim 13, wherein the information relevant to the broadcaster collected by the OTT application includes user identification, date, time, Internet Protocol (IP) address, bandwidth, latency time, TV receiver manufacturer/model, AVA content display status, or a combination thereof.

* * * * *